S. APOSTOLOFF.
METHOD OF MAKING HOLLOW BODIES.
APPLICATION FILED JAN. 8, 1917.
1,256,762.
Patented Feb. 19, 1918.
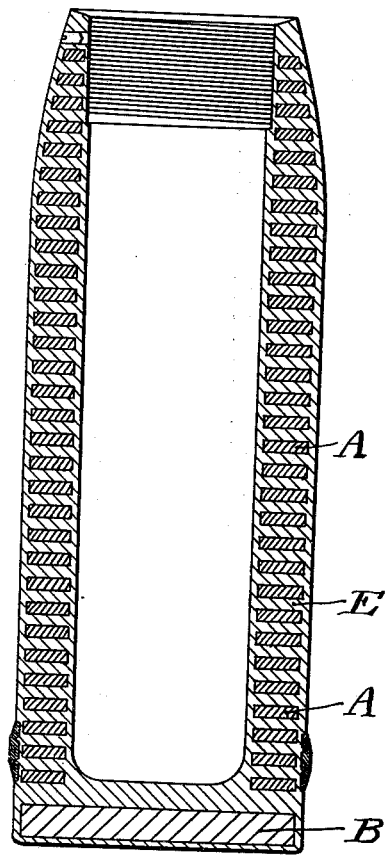
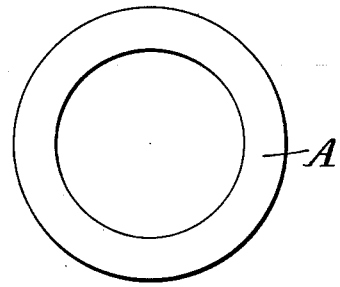
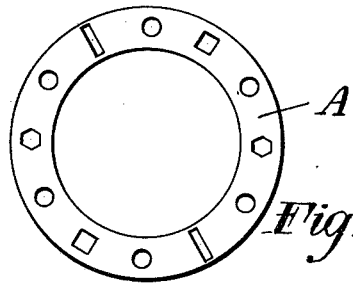
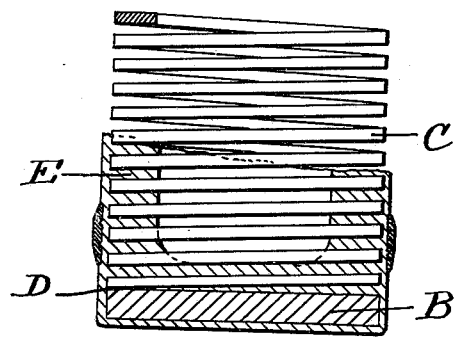
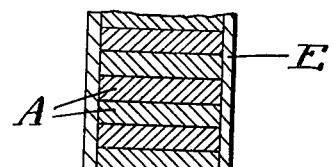
Serge Apostoloff Inventor
By his Attorneys
Ogden & Sheldon

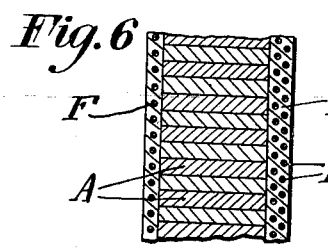
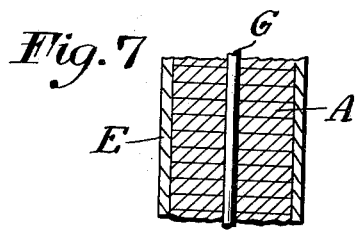
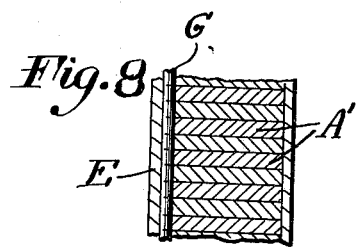
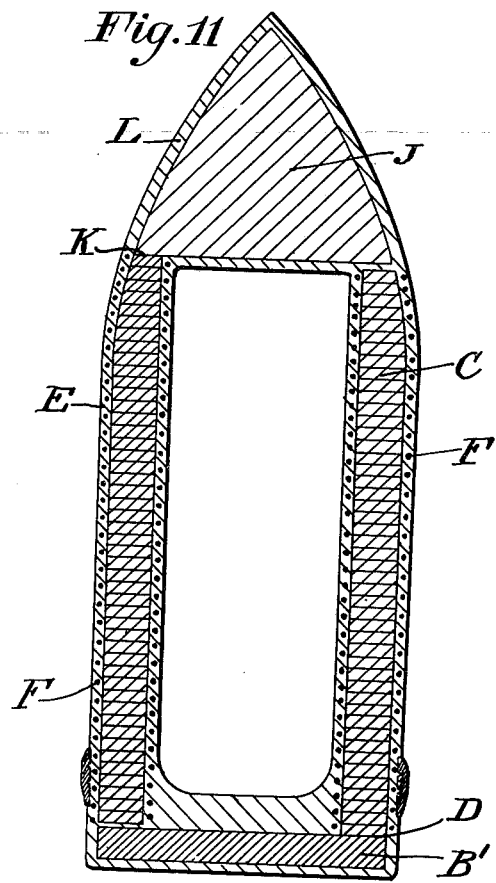
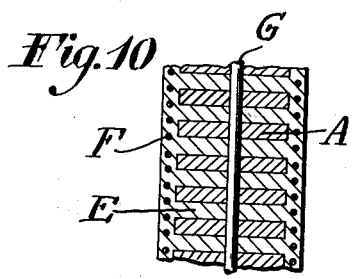
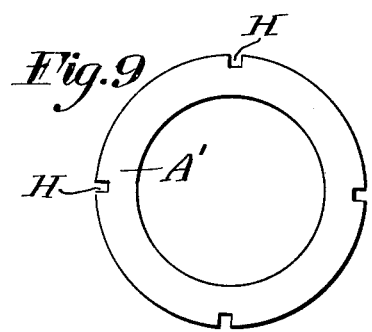

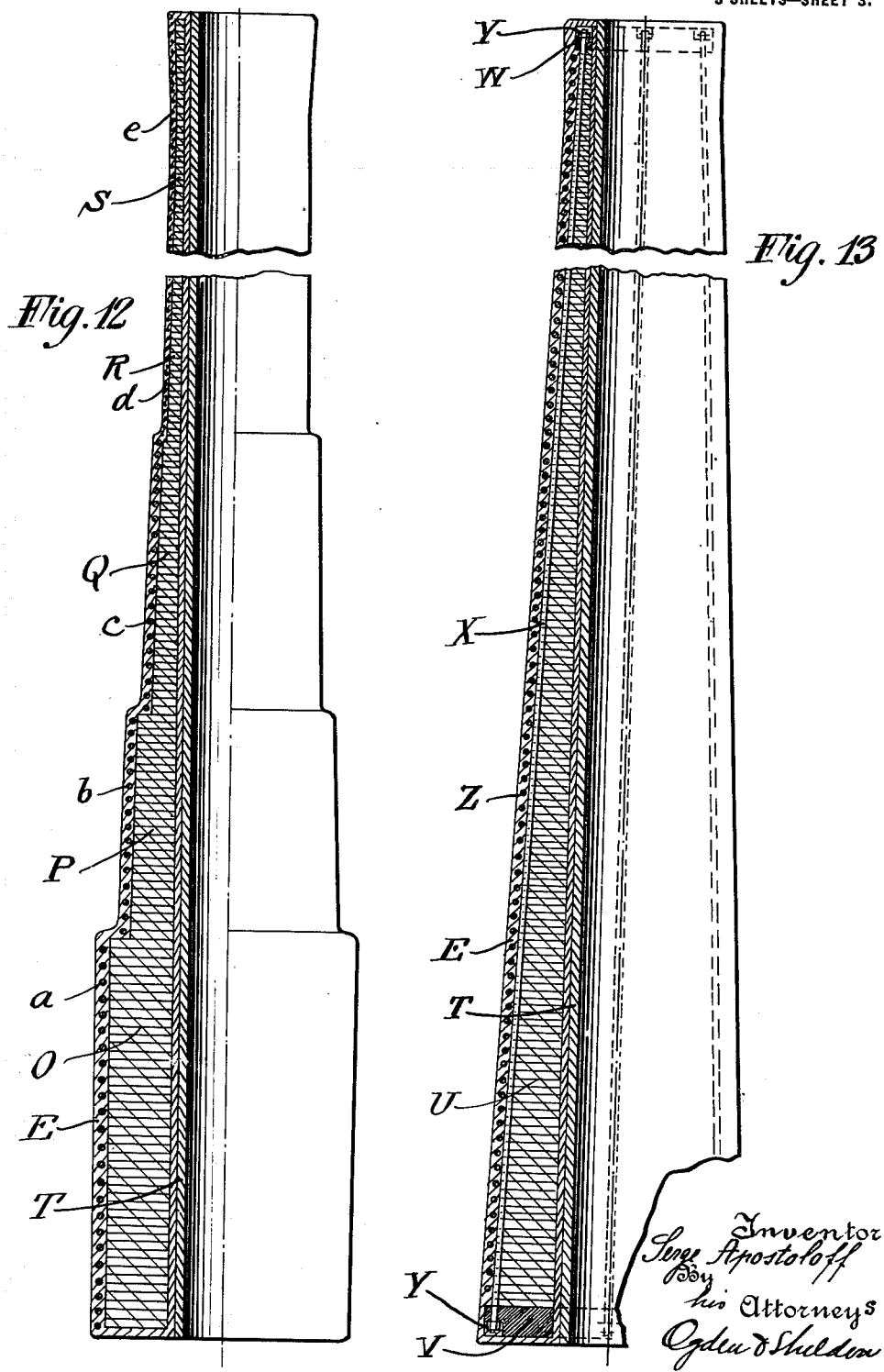

UNITED STATES PATENT OFFICE.

SERGE APOSTOLOFF, OF LONDON, ENGLAND, ASSIGNOR OF ONE-HALF TO WALTON FERGUSON, JR., OF NEW YORK, N. Y.

METHOD OF MAKING HOLLOW BODIES.

1,256,762.  Specification of Letters Patent.  Patented Feb. 19, 1918.

Application filed January 8, 1917. Serial No. 141,176.

*To all whom it may concern:*

Be it known that I, SERGE APOSTOLOFF, a citizen of Great Britain, and a resident of London, England, temporarily residing in the borough of Manhattan, city, county, and State of New York, have invented certain new and useful Improvements in Methods of Making Hollow Bodies, of which the following is a specification, accompanied by drawings.

This invention relates to a new and improved method of making hollow bodies of metal, but more particularly to a method of manufacturing composite reinforced hollow metal bodies and structures, such as pots, vats, pipes, shell cases, guns and the like. The invention also relates to the new and improved reinforced articles or bodies so produced by my improved method.

The object of the invention is to devise a rapid and inexpensive method of producing such reinforced structures of great strength and thus enable hollow bodies, wholly or partly of cast metal, to be used for purposes to which ordinary cast metal bodies can not be applied, as they would not have sufficient strength. In accordance with my invention, the hollow bodies are formed partly of annular disks of metal of suitable shape, and these disks may be of cast or rolled or wrought metal or formed in any other desired manner, and placed either face to face to form the walls of the structure; or they may be separated from each other. Reinforcing members in the form of metallic spirals may be placed inside and outside of the walls formed by the disks, and metal is cast around said reinforcing members, so that said spiral members are embedded on all sides in the cast metal and incorporated with said metal. In reinforcing my hollow structures, I prefer to use as the reinforcing member a metallic spiral and the convolutions of the spiral are embedded in the cast metal. The skeleton of wire forming the spiral is of approximately the same shape as the completed hollow structure to be produced and in carrying out the method the spiral member is supported in a suitable mold around the disks, and the metal is cast in the mold.

Further objects of the invention will hereinafter appear, and examples of the structures produced are illustrated in the accompanying drawings, in which—

Figure 1 is a vertical sectional view of a hollow body in the form of a shell case made in accordance with my invention;

Fig. 2 is an elevation partly broken away and partly in vertical section of a spiral, which may be used instead of the disks in forming the structure;

Fig. 3 is a plan view of an unperforated disk or spiral;

Fig. 4 is a plan view of a perforated disk or spiral showing different forms of perforations;

Fig. 5 is a vertical sectional view partly broken away, taken through the wall of the structure like Fig. 1, but showing the disks in contact with each other, instead of separated from each other as in Fig. 1;

Fig. 6 is a broken view similar to Fig. 5, showing a portion of the wall of a hollow structure having disks and spiral reinforcing members surrounding the same;

Fig. 7 is a similar view showing the disks held together by a rod or rods passing through the centers of the disks;

Fig. 8 is a similar view showing the rod or rods passing through notches in the edges of the disks;

Fig. 9 is a plan view of the notched disks shown in Fig. 8;

Fig. 10 is a view similar to Figs. 5, 6, 7, and 8, showing disks spaced apart with a rod to hold them in position and spirals surrounding the disks;

Fig. 11 is a vertical sectional view of an armor-piercing projectile formed in accordance with my invention;

Fig. 12 is a side elevation, partly in longitudinal section, of a gun made in accordance with my invention; and, Fig. 13 is a similar view of a modification of a gun made in accordance with my invention.

Referring to the drawings, and more particularly to Fig. 1, which shows the invention applied to the manufacture of a shell case, A represents a series of annular metal disks placed in proximity to each other to form the basis or foundation of the walls of the shell. As shown, these disks A are separated from each other by spaces, and metal is cast around and between the disks to complete the walls of the structure. In forming the shell case, a metal base B is provided in a suitable mold, and the disks are suitably supported in spaced position in the mold, as well understood by those skilled in the art of casting metal. By this means the metal is cast around and between all the disks and around the metal base B.

In the modification of the invention, a continuous spiral of flat metal may be formed, as shown at C in Fig. 2, one end of which is suitably welded as at D to the metal base B. The base B and spiral are placed in the mold and metal E is cast around and between the convolutions of the spiral, thus embedding the spiral and base B in the cast metal.

Fig. 3 shows a top plan view of the disks or the spiral which may be unperforated, or perforated as shown in Fig. 4 with different forms of perforations as desired. When perforated disks or a perforated spiral is used, the metal is cast through the perforations and binds the parts together.

In Fig. 5 the broken section taken through the wall of a shell case is shown, in which the disks A are placed face to face in contact with each other instead of separated, and the metal E is cast around the disks. Fig. 5 will also represent the section of the wall when a spiral C is used in which the convolutions are in contact with each other instead of separated as shown in Fig. 2.

In Fig. 6 a section of the wall of a shell case or hollow structure is shown, in which the disks A are placed in contact with each other and spiral reinforcing members F surround the disks, both inside and outside of the structure, or on either side, as desired. The cast metal is cast around the spiral reinforcing members and the disks.

In Fig. 7 the disks A are in contact with each other and held tightly together as by means of a rod G passing longitudinally through the disks, and secured at each end as by means of nuts (not shown).

In Fig. 8 the rods G pass through the slots or notches H in the edges of the disks A', as illustrated in Fig. 9, and in Figs. 7 and 8 the spiral reinforcing members around the disks have been omitted, although they can be provided if desired, as illustrated in Figs. 6 and 10.

In Fig. 10 the disks A are placed apart and spiral reinforcing members F are used as well as the rods G.

In Fig. 11 an armor-piercing projectile is shown having a hard point or nose J and walls formed in accordance with my invention. The walls are preferably formed by means of the spiral C illustrated in Fig. 2, one end D of which is welded to a base B' and the other end K welded to the hard point J. Additional spiral reinforcing members F surround the spiral C and metal E is cast around the main spiral C, the reinforcing spirals F, the base B' and the point J. The advantage of this construction resides primarily in the fact that the hard point J is provided with a soft nose L and a soft body portion formed of the spirals and the cast metal. The functions of these combinations of hard and soft parts are well understood by those skilled in the art, but my invention provides a means for manufacturing such an armor-piercing projectile shell in the most economical and efficient manner.

In Fig. 12 a gun is shown formed of disks O, P, Q, R and S which may be placed in contact with each other, or separated from each other as shown in the wall structure illustrated in Fig. 10 and reinforced by spiral members $a$, $b$, $c$, $d$, and $e$. The cast metal E is then cast around said members and an inner steel sleeve T may be provided in the gun to take the rifling.

In Fig. 13 a modified form of gun is shown, in which the disks U decrease in diameter from the breach to the muzzle, so that the outside of the gun tapers, and these disks are held in position between the steel plates V and W by means of the rods X, provided with the nuts Y. Spiral reinforcing members Z may be placed outside of the disks U, or outside and inside as illustrated in the wall structures shown in Figs. 6 and 10, which also applies to the construction shown in Fig. 12.

In all of the forms of the invention shown, the cast metal represented at E embeds the disks and spiral reinforcing members in the metal. If a plurality of spiral reinforcing members, as distinguished from the disks are used side by side, they may be wound or combined into one reinforcing member in a variety of ways, and I am not to be understood as limiting the invention to the structure shown in the drawings.

Furthermore, it is to be understood that substantially the same methods of manufacture apply both to the guns, the shell case, the armor-piercing projectile, and other hollow structures embodying the invention.

The reinforcing spirals outside or inside of the disks, or the main spiral may be placed side by side in layers before casting, or the metal may be cast upon one reinforcing member and then another layer of metal cast over the first layer with a second reinforcing member, and so on. In either case the structure produced is illustrated in Fig. 6, showing a plurality of spirals however cast in the structure. The individual convolutions of the coils may also be arranged in various relations, as desired.

The disks for special requirements may consist of various metals alternatively interposed, as for instance, copper, soft lead, zinc, nickel, soft iron, or alloys of such metals, and the disks may be of different thickness, hardness or toughness, or generally of different metal constituents, and in fact, any suitable combination of different metals, or metals of the same generic kind but having different characteristics may be used for the disks.

In casting the metal suitable provision should be made to absorb the oxygen or other vapors which would tend to cause bubbles or blow holes, but this procedure will be understood by those skilled in the art.

One of the great advantages of this invention resides in the fact that the resistance to pressure is afforded by the greatest diameter of the disks or the main spiral, and by this means composite structures of great strength are produced.

I claim and desire to obtain by Letters Patent the following:

1. The method substantially as herein-described, of making a hollow metal structure, which consists in placing a series of annular metal disks face to face in proximity to each other, then casting metal around said disks to cover their exterior and interior surfaces, whereby the disks become embedded in the cast metal.

2. The method substantially as herein described, of making a hollow metal structure, which consists in placing a series of annular metal disks face to face in proximity to each other, then casting metal around said disks, and around a spiral metallic member which encircles the series of disks, whereby both the disks and said spiral member are embedded on all sides in the cast metal.

3. The method substantially as herein described, of making a hollow metal structure, which consists in placing a series of annular metal disks face to face in proximity to each other, thus forming the foundation of the structure, then casting metal around a spiral metallic member, which encircles the said series of disks.

4. The method substantially as herein described, of making a hollow metal structure, which consists in placing a series of annular metal disks face to face in proximity to each other, thus forming the foundation of the structure, then placing a spiral metallic member around said series of disks and casting metal around said spiral member and incorporating the cast metal with the convolutions of said member, whereby the spirals are embedded on all sides in the cast metal.

5. The method substantially as herein described, of making a hollow metal structure, which consists in placing a series of annular metal disks face to face in proximity to each other, thus forming the foundation of the structure, then placing spiral metallic members inside and outside of said series of disks and casting metal around said spiral members, incorporating the cast metal with the convolutions of said members, whereby the spirals are embedded on all sides in the cast metal.

6. The method substantially as herein described, of making a hollow metal structure, which consists in placing a series of annular metal disks face to face in contact with each other, thus forming the foundation of the structure, securing the said series of metal disks tightly together, then casting metal around a spiral metallic member, which encircles the said series of disks.

7. The method substantially as herein described, of making a hollow metal structure, which consists in placing a series of annular metal disks face to face in contact with each other, thus forming the foundation of the structure, securing the said series of metal disks tightly together, then placing a spiral metallic member around said series of disks and casting metal around said spiral member and incorporating the cast metal with the convolutions of said member, whereby the spirals are embedded on all sides in the cast metal.

8. The method substantially as herein described, of making a hollow metal structure, which consists in placing a series of annular metal disks face to face in contact with each other, thus forming the foundation of the structure, securing the said series of metal disks tightly together, then placing spiral metallic members inside and outside of said series of disks and casting metal around said spiral members, incorporating the cast metal with the convolutions of said members, whereby the spirals are embedded on all sides in the cast metal.

In testimony whereof I have signed this specification in the presence of two subscribing witnesses.

SERGE APOSTOLOFF.

Witnesses:
A. C. PARHAM,
M. M. RIEMAN.